Patented Oct. 25, 1932

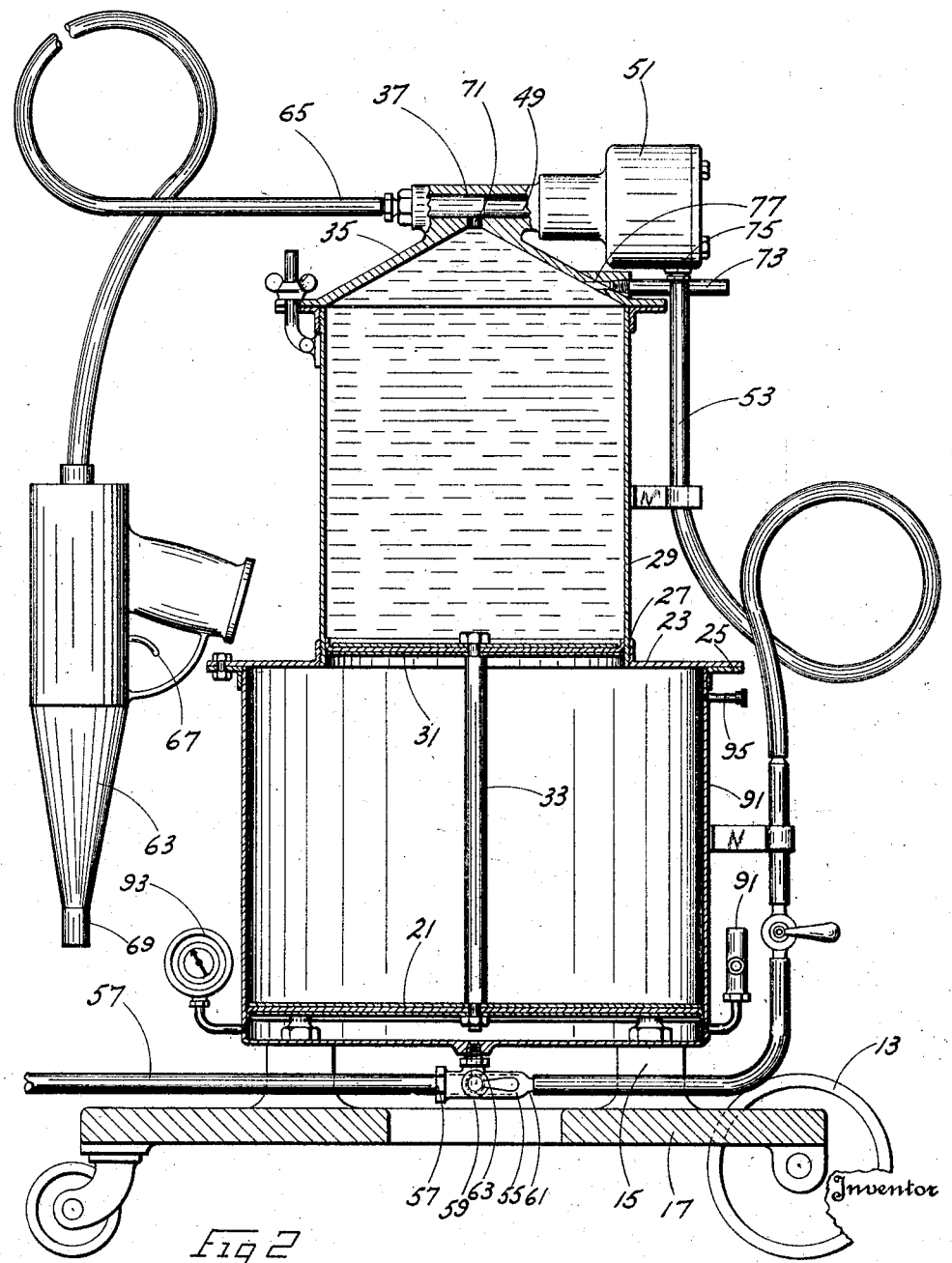

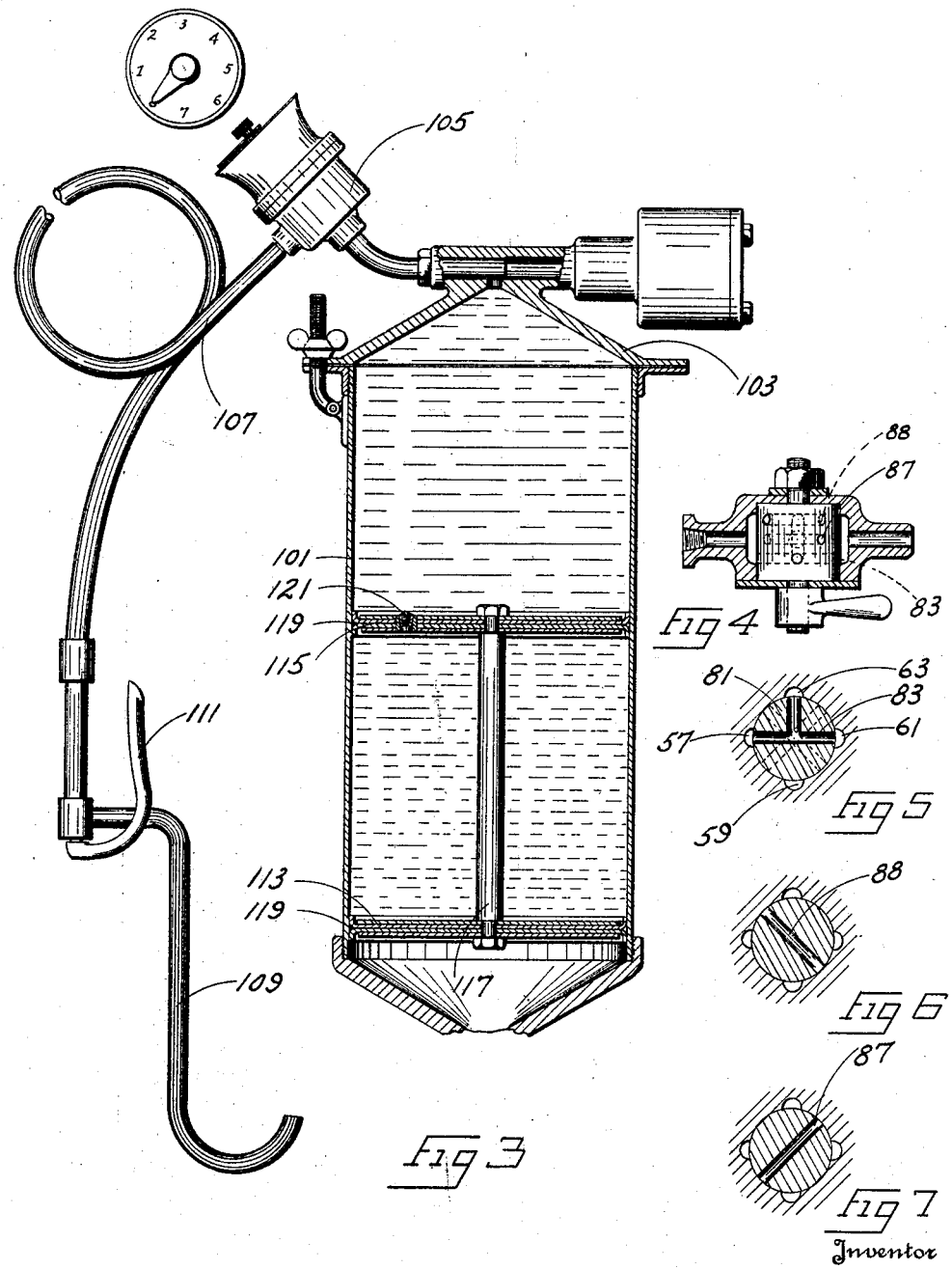

1,885,081

UNITED STATES PATENT OFFICE

KENNETH S. CLAPP, OF CLEVELAND, OHIO

LUBRICATOR

Application filed July 13, 1931. Serial No. 550,350.

The present invention relates to a dispensing apparatus for plastic and semi-fluid materials such as greases, paints and analogous substances. The invention is primarily concerned however, with the dispensing of lubricants, for lubricating the chassis bearings of an automotive vehicle and for transferring grease to the transmission and differential of the same.

Where chassis lubrication is concerned, the chassis of every modern automotive vehicle is equipped with pressure connections through which lubricating grease is discharged under pressure and caused to permeate the bearing throughout its entire length. In order to effectively lubricate the bearing the grease must be forced into the connection under extremely high pressure. Toward this end a number of devices commonly referred to as grease guns have appeared on the market with varying degrees of success. Some of these so-called grease guns are small and portable and are adapted for manual operation and may be included in the auxiliary equipment of the automobile. Other forms of grease guns have appeared which are not portable in the sense that they may be carried around in the vehicle but which are portable in the sense that they are comparatively large and may be transported around garages or filling stations and brought to the scene of operation where a vehicle is to be lubricated. It is to this latter type of grease gun or lubricant dispensing apparatus that the present invention appertains. This type of apparatus that has appeared on the market is sometimes adapted to employ manually operated or power driven mechanically developed pressure for forcing the lubricant into the bearing. In more modern garages, filling stations and the like this type of apparatus is driven by compressed air or by another source of motive fluid. The present invention is generic to both of the above mentioned types of dispensing apparatus and in this application three modifications, one representing a mechanically operated device and the other two representing a fluid actuated device, have been disclosed.

The form of devices which supply lubricants to the chassis bearings of an automobile must necessarily operate under extremely high pressure. Frequently where a bearing has become clogged with grit or dirt the apparatus is unable to develop sufficient pressure to force lubricant through the bearing. In these mechanically operated devices, excess manual or mechanically developed pressure applied to the device serves to rupture the mechanical parts of the same before sufficient pressure is developed to force the lubricant through the clogged bearing. It is an object of the present invention therefore to provide a mechanically operated lubricant dispensing device which when a particularly faulty clogged bearing is encountered, the apparatus ceases to function operatively and consequently the danger of rupture of the mechanical parts of the device is eliminated. Under such a condition the operator may jar the bearing with a hammer to loosen the clogged material or he may disassemble the bearing and clean the same.

Where transmission or differential lubrication is concerned, and where heavy pressure is not required the manually operated or power driven mechanical devices above referred to have met with greater success than the motive fluid operating devices.

Where devices which employ compressed air for their operation are employed, a piston generally serves to compress the grease in a cylinder for dispensing the same. In this type of device it has been found that the motive fluid, which usually is compressed air, on the underneath side of the piston frequently leaks past the edge of the piston into the lubricant reservoir. These devices, being metered as they usually are, therefore fail to discharge the required metered amount of lubricant by virtue of the fact that the motive fluid which has leaked past the piston is discharged therewith. That this situation is of very frequent occurrence may be evidenced by a sputtering noise at the discharge nozzle. Accordingly the present invention contemplates the provision of an apparatus which will overcome this limitation and toward this end the invention consists in a compressed air actuated device in which compressed air does not come into contact with the piston which serves to compress the lubricant. The invention further contemplates the provision of a device which will give an audible signal when the lubricant has become exhausted. Yet another provision of the invention is to provide a lubricant dispensing device which is operable by a single manual control to dispense lubricant accurately as far as quantity is concerned and in which there is a provision for retracting the piston by the same manual control to permit refilling of the lubricant chamber. Convenience of arrangement of parts, ruggedness and consequent durability, simplicity of construction and corresponding inexpense of manufacture are further desirable features that have been borne in mind in the production and development of the present invention.

Other objects and advantages of the invention not at this time more particularly enumerated will become more readily apparent as the nature of the invention is better understood and the same consists in the construction, combination and arrangement of parts as shown in the accompanying three sheets of drawings in which:

Figure 2 is a side elevation, partly in section of a fluid actuated dispensing device, and Figure 3 is a fragmentary side elevation partly in section of a portion of a modified form of dispensing apparatus showing a metered device employed in connection with the present invention.

Figures 4, 5, 6 and 7 are diagrammatic views of a valve employed in connection with the present invention.

In all of the above described views, like characters of reference are employed to designate like parts throughout.

Figure 1:
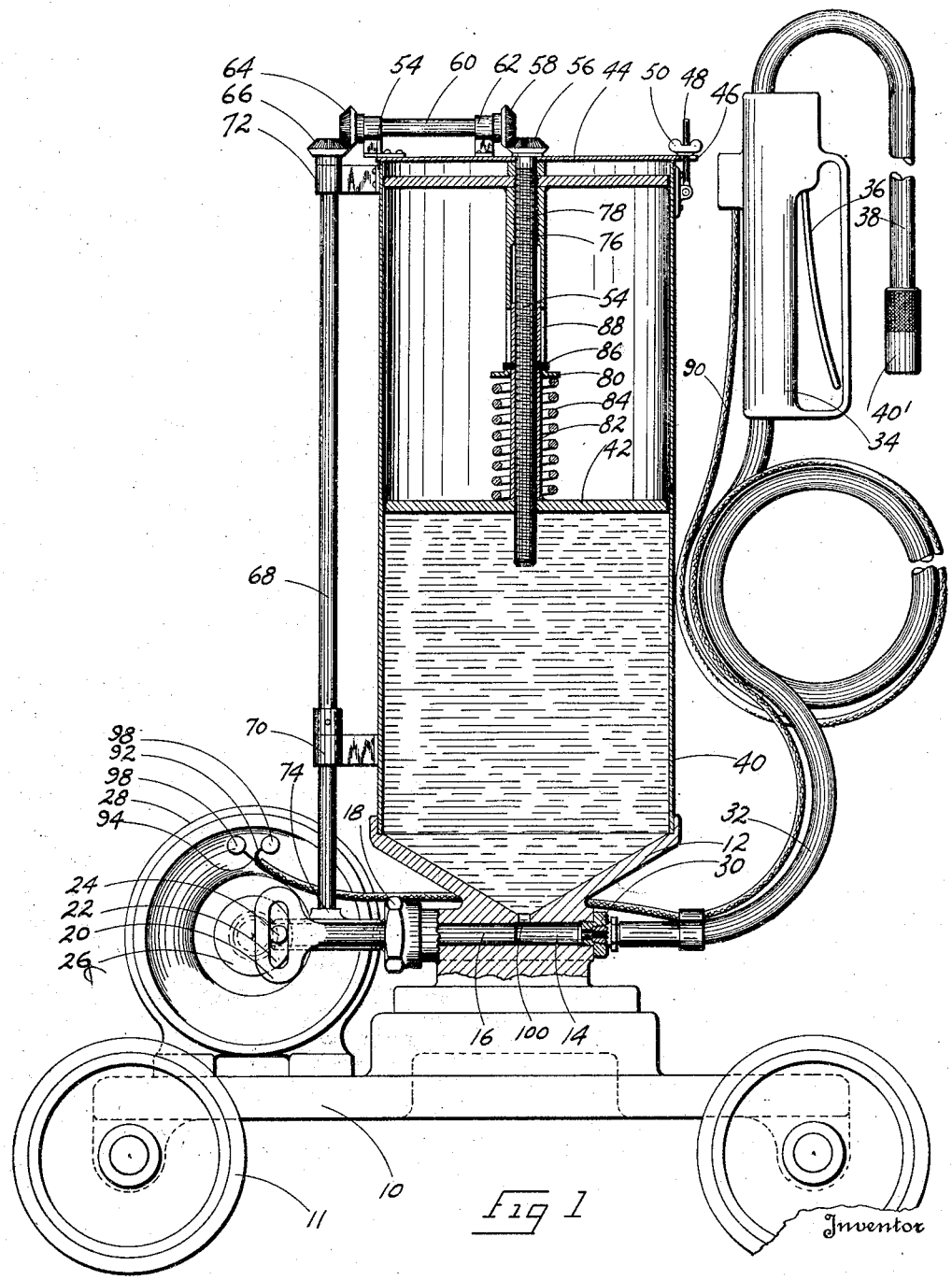
Figure 1 is a side elevation, partly in section of a manually operated lubricant dispensing device.

Referring now to Figure 1 wherein the mechanically operated lubricant dispensing device is shown, the dispensing device, is mounted upon a suitable truck or chassis 10 having wheels 11 for permitting the dispensing device to be transported from one place to another. Supported upon this chassis is a cylinder head 12 which is provided with a transverse bore or cylinder 14 in which a plunger 16 is adapted to reciprocate. The end of the bore 14 is closed by means of a fluid tight hexagonal cap 18 through which cap the plunger 16 extends. The outer end of the plunger 16 has formed thereon an enlarged portion 20 having a slot 22 therein through which slot there extends an eccentric pin 24 on a rotatable disc 25 adapted to be rotated by means of a motor 28. The outer end of the bore 14 is provided with a connection 30 for attachment to a lubricant hose 32. The free end of the hose 32 has secured thereto a dispensing unit 34 in which there is a valve (not shown) which is actuated by means of a manually operated lever 36. Extending from one end of the dispensing unit 34 is a short hose section 38 having a pressure connection 40' on its end. The cylinder head 12 serves to support a cylinder 40. Slidably mounted in the cylinder 40 is the piston 42 which piston is adapted to act upon the grease or lubricant to eject the same from the container. The upper end of the cylinder is closed by means of a plate 44 having slots 46 therein adapted to receive a pivoted bolt 48 therein. This bolt 48 threadedly receives a wing nut 50 which clamps against the plate 44 to hold the same in position. This plate is pivoted as at 52 to the cylinder 40 so that the same may be swung upwardly when the cylinder 40 is to be filled with grease or lubricant. Journaled in the plate 44 and in the piston 42 is a threaded shaft 54 having a beveled gear 56 outside of the cylinder. This gear 56 is adapted to mesh with a beveled gear 58 on a horizontal shaft 60 supported on bearing brackets 62 secured to the plate 44. The other end of the shaft carries a beveled gear meshing with a beveled gear 66 on a vertical shaft 68 supported in bearing brackets 70 and 72. The lower end of the shaft 68 has mounted thereon a gear 74 meshing with a gear not shown which is driven by a motor 28. Thus it will be seen that as the motor 28 is driven, the shaft 54 will be rotated at a constant speed by means of the train of gearing and the shaft 54 will be uniformly rotated. Mounted on the shaft 54 is a sleeve 76 which is internally threaded as at 78 to threadedly receive this shaft 54. The lower end of the sleeve 76 is outwardly flared as at 80. The piston 42 is provided with a sleeve 82 centrally thereof through which sleeve and piston the shaft 54 extends. Disposed between the piston 42 and the outwardly flared portion 80 and around the sleeve 82 is a compression spring 84. The sleeve 82 carries a pair of bearings 86 which project through a pair of slots 88 formed in the sleeve 76. After the shaft 78 is uniformly rotated by means of a motor 28 the sleeve 76 travels downwardly forcing the piston 42 downwardly ahead of the same by pressure applied through the compression spring 84. The spring 84 is comparatively heavy and by means of this spring the piston 42 is enabled to develop sufficient pressure for all ordinary uses of the device. However, should the pressure connection for any particular bearing become clogged, the pressure developed by the piston 42 cannot exceed the compressive strength of the spring 84. When such a condition is encountered the piston 42 ceases to travel due to the extremely high resistance to compression of the fluid or lubricant. As the motor 28 continues to operate the shaft 54 the slot 76 continues to move downwardly thereby compressing the spring 84. As this downward movement of the slot 76 is a comparatively slow movement, the spring 84 is slowly compressed and the pins 86 ride upwardly in the slots 88, relatively speaking. Before the spring 88 reaches the limit of its compression the operator will notice that no grease is passing through the grease connection at the bearing being treated. He will immediately suspect that this bearing is clogged and accordingly he will shut off the motor 28. By jarring the bearing with a hammer or by disassembling the bearing and reassembling of the bearing the faulty condition of the same may be relieved and subsequently the bearing may be properly lubricated.

The actual dispensing unit 34 has leading therefrom an electrical conduit 90 which conduit carries wires 92 and 94 leading to terminals 96 and 98 on the motor 28. When the lever is manually depressed, a circuit is closed through the wires 92 and 94 and through a switch (not shown) and the motor is started into operation. A port 100 communicates with the interior of the cylinder 40 and with the bore 14. Consequently as the piston 42 descends fluid is forced into the bore 14 and is forcibly ejected by means of the plunger 16 which acts as a booster pump. It will be seen from the above description that a device which is unlikely to become damaged due to a clogged bearing and also a device which is efficient in its operation and which is capable of performing the services required of it has been provided.

Referring now to Figure 2, another form of the invention is shown. In this form of the invention the apparatus is designed to operate by means of fluid pressure.

The apparatus disclosed in this figure is mounted upon the chassis 17 of a truck. This chassis is provided with wheels 13. Supported upon a pair of standards 15 is a cylinder 19 having the lower end thereof closed. Disposed within this cylinder 19 is a piston 21, the periphery of which is sealed against the walls of the cylinder 19. The upper end of the cylinder 19 is partially closed by means of an annular ring-like plate 23 which is secured to the cylinder by means of an annular angle member 25. A cylinder 29 of smaller diameter than the cylinder 19 has its lower end secured to an annular upturned flange 27 on the ring 23. Slidably disposed within this cylinder 29 is a piston 31 the rim of which is sealed against the walls of this cylinder 29. A thrust rod 33 is connected centrally to the piston 31 and to the piston 21.

The upper end of the cylinder 29 is closed by a cylinder head 35 similar to the cylinder head 12. This head is held in position on the cylinder 29 by a wing nut and a bolt arrangement similar to the wing nut and bolt 48, 50. The head 35 is provided with a transverse bore 37, which bore is in communication with the interior of the cylinder 29 by means of a bolt 71.

A plunger 49 is slidably disposed within the bore 37 and is adapted to be reciprocated by means of a fluid actuated motor 51. Fluid which is forced in to the bore 37 is ejected therefrom by the plunger 49 through a flexible hose 65 to a dispensing unit 63. This dispensing unit is provided with a nozzle 69 and a trigger type valve control 67. This dispensing unit is a standard construction and no claim is made in this application to any novelty existing in the same, except in so far as the dispensing unit as a whole enters into combination with the other elements of the invention, the novelty residing rather in the dispensing mechanism which supplies lubricant under pressure to the dispensing unit 63. The dispensing unit is of a conventional type which makes a predetermined length of stroke upon each reciprocation of the plunger 49 so that a predetermined quantity of fluid is dispensed with each stroke of the motor. Accordingly, the dispensing unit may not only serve as a device for moving the fluid but it may also serve as a metering device. It is sufficient to merely add a counter actuated with each stroke of the plunger and calibrated in units of volume in order to effect the measuring operation. Dispensing devices of that type are well known in the art.

The motor 51 is of the fluid actuating type and preferably employs compressed air for its operation. Accordingly a compressed air line is shown at 53 having a flexible length 53'. Disposed within the line 53 is a valve 55. This valve 55 is provided with cross bores having inlets 57 and 63 and outlets 61 and 59 respectively. The valve is manually operable to supply air across the fluid line 53 to the motor 51 or to vent air on the underneath side of the piston 21 to atmosphere for retracting the pistons 21 and 31 when it is desired to refill the cylinder 21 with a lubricant.

In order to positively retract the pistons 31 and 21 the flexible air line 53 is provided with a quickly detachable connection 73 which may selectively be applied to the inlet port 75 of the motor or to a bore 77 communicating with the interior of the cylinder head 35. When it is desired to retract the piston the connection 73 is applied to the bore 77 and the valve 61 opened through the air line 53.

The valve 61 is diagrammatically represented in Figures 4, 5, 6 and 7. This valve is provided with a plug 81 having a three-way bore 83 therein and when the valve is in the position shown in Figure 5, motive fluid is admitted to the nut 51 through the conduit 53 and to the interior of the cylinder 19 behind the piston 21. Thus fluid pressure applied to the underneath side of the piston 21 forces this piston and the piston 31 upwardly to eject lubricant under pressure into the bore 37 where the lubricant is acted upon by the plunger 49 of the booster pump 51. The plug 81 of the valve 61 is provided with a bore 85 and a bore 87 which bores are distributed in different planes and are so distributed that communication between the interior of the cylinder 19, behind the piston 21, may be completed to atmosphere and also so that communication may be had from the source of motive fluid to the booster pump 51. When the valve is turned to effect this operation the quickly detachable connection 73, having a check valve therein, is applied to the port 77 and compressed air is supplied to the upper side of the piston 31 to retract the same and such retraction of the piston 31 is made possible by the fact that the cylinder 19 is vented to atmosphere through the bore 85 in the plug 81. A safety valve is designated at 91 and this valve is disposed in the cylinder 19 on the working side of the piston 21 so that extremely high pressures in the cylinder 19 cannot be attained. A gage 93 is also provided for indicating the pressure that is maintained on the underneath side of the piston 21.

When the lubricant contained in the cylinder 29 is practically exhausted, both the pistons 21 and 31 will have reached the limit of their stroke. In order that an audible signal may be given to warn the attendant that the lubricant has been exhausted, a whistle designated at 95 is plugged into the cylinder 19 adjacent the top of the same. When the piston 21 passes this whistle 95 fluid pressure is exhausted through the whistle thereby giving an audible signal. The whistle 95 is of the conventional type provided with open passages through which air may pass at all times, the whistle being blown only when air is forced through it at sufficiently high rate to set up vibrations in the flowing air. As will be observed in Fig. 2 the whistle 95 is arranged between the pistons 21 and 31 so that it vents, at all times, the space between those pistons. Any air escaping past the piston 21 escapes through the whistle 95 so that there is no substantial air pressure acting on the underneath side of piston 31, as viewed in Fig. 2, other than atmospheric. Under those conditions the pressure exerted on the top side of the piston 31 by the fluid under compression is much greater than the fluid pressure on the underneath side of that piston so that if any fluid escapes past the piston 31 it will be the oil or grease moving downwardly rather than compressed air moving upwardly past the piston 31.

It will be seen from the above description that the spacing of the pistons 21 and 31 by the thrust rod 33 prevents high pressure from being developed on the underneath side of the piston 31.

Where no provision has been made for relieving the underneath side of the pressure piston from high pressures it frequently happens that motive fluid leaks around the edges of the piston into the lubricant and this motive fluid, which is usually compressed air, passes with the lubricant to the dispensing unit 63. The present invention therefore remedies this limitation. Devices of this nature are usually provided with a lubricant meter in accordance with the various laws which require the use of such meters. These meters are sensitive to the passage of air or other fluid as well as to the passage of lubricant therethrough. Under conditions where air is contained in the lubricant in a suspended state, the customer is deceived by the reading of the meter and he is led to believe that the meter has recorded the amount of lubricant he has received when in reality the meter has recorded the amount of fluid and air which has traversed the same.

Referring now to Figure 3 a modified form of dispensing device is shown. This device consists in a cylinder 101 having a head 103 thereon similar to the head 35. In this view a fluid meter 105 is disposed within the flexible conduit 107 which supplies lubricant to a dispensing nozzle 109. This dispensing nozzle 109 is of the type which is adapted for supplying heavy grease to the transmission and differential and is controlled by means of a manually operable lever 111. Disposed within the cylinder 101 are a pair of pistons 113 and 115 which pistons are spaced by means of a thrust rod 117. Both of the pistons 113, 115 are sealed on both sides of the same against the wall of the cylinder 101 as shown at 119. The piston 115 is provided with a filling plug 121 through which lubricant oil may be introduced. The space between the piston 113 and 115 is completely filled with a lubricant which may be kerosene or any grade of motor oil lubricant. Compressed air applied to the underneath side of the piston 113 serves to force this piston upwardly together with the piston 115. Because of the movable lubricant contained between the pistons 113 and 115 no motive fluid comes in contact with the piston 113 and accordingly the lubricant which is being dispensed is not contaminated. In other respects this form of the invention is substantially the same as the form shown in Figure 2.

The head 103 illustrated in Fig. 3 is similar in many respects to the head 35 illustrated in Fig. 2 and they may be used interchangeably. Where the head 103 is used the dispensing unit operates merely as a pump and the meter 105 is arranged in the line to be driven by the fluid passing therethrough for metering it. With this type of meter the presence of air bubbles in the fluid being dispensed gives rise to erroneous measurement. Accordingly, the type of construction illustrated in Fig. 2, when employed in connection with a head of the type, illustrated in Fig. 3, has the same advantage as before pointed out in connection with Fig. 2.

The invention is not to be limited to the exact arrangement of parts shown in the accompanying three sheets of drawings or described in this specification as various changes in the details of construction may be resorted to without departing from the spirit of the invention. Only in so far as the invention has been particularly pointed out in the accompanying claims is the same to be limited.

What I claim is:—

1. In a lubricator, a cylinder having a pair of rigidly connected spaced pistons therein, one of said pistons being adapted to compress a lubricant contained within the cylinder, the other of said pistons being adapted to have motive fluid applied thereto for moving said pistons, and means on the cylinder at the side of the lubricant compressing piston distant from the lubricant in all positions of the piston for audibly indicating the completion of the stroke of said pistons.

2. In a lubricator, a cylinder having a pair of spaced rigidly connected pistons therein, one of said pistons being adapted to compress a lubricant contained within the cylinder, the other of said pistons being adapted to have fluid pressure applied to one side thereof, and a whistle plugged into the cylinder wall at a point on that side of the lubricant compressing piston distant from the lubricant in all positions of the piston for discharging compressed air from the cylinder when said other piston is moved past said whistle.

3. In a lubricator, a cylinder having lubricant therein, a piston in the cylinder for expressing the lubricant, a second cylinder, said cylinders being mounted together, a second piston in the second cylinder, a rigid connection between the pistons, fluid means acting within the second cylinder upon the second piston at the side distant from the first piston, vent means arranged between the pistons, said vent means being carried by the second cylinder and arranged to exhaust air from that cylinder at the end of the stroke of the pistons.

4. A lubricant dispensing device having a pair of connected cylinders, said cylinders being in fluid communication one with the other, a piston in each cylinder, means rigidly connecting the pistons, means for introducing fluid under pressure into the cylinder at the end of the piston therein distant from the other piston, the other cylinder being adapted to contain lubricant at the end of the piston therein distant from the first piston, an outlet for the lubricant containing cylinder, a pump at the outlet for increasing the pressure of the lubricant, and vent means for the cylinders arranged between the pistons for exhausting fluid under pressure escaping past the first piston.

5. A lubricant dispensing device having connected cylinders in fluid communication one with the other, a piston in each cylinder, means rigidly connecting the pistons, means for introducing fluid under pressure into one cylinder at the end of the piston therein distant from the other piston, the other cylinder being adapted to contain lubricant at the end of the piston distant from the first piston, an outlet for the lubricant containing cylinder, a measuring device at the outlet for determining the quantity of lubricant expelled and vent means for the cylinders arranged between the pistons for exhausting fluid under pressure escaping past the first piston.

6. A lubricant dispensing device having a cylindrical body, a pair of connected pistons moveable in sealing engagement within said body, means for introducing fluid into the cylindrical body at the end of one piston distant from the other piston, said cylindrical body being adapted to contain lubricant at the end of the piston distant from the first piston, an outlet for the lubricant containing portion of the cylindrical body, a measuring device arranged at the outlet for determining the quantity of lubricant expelled and vent means for the cylindrical body arranged between the pistons for exhausting fluid under pressure escaping past the first piston.

In testimony whereof I hereunto affix my signature.

KENNETH S. CLAPP.